Patented Mar. 11, 1924.

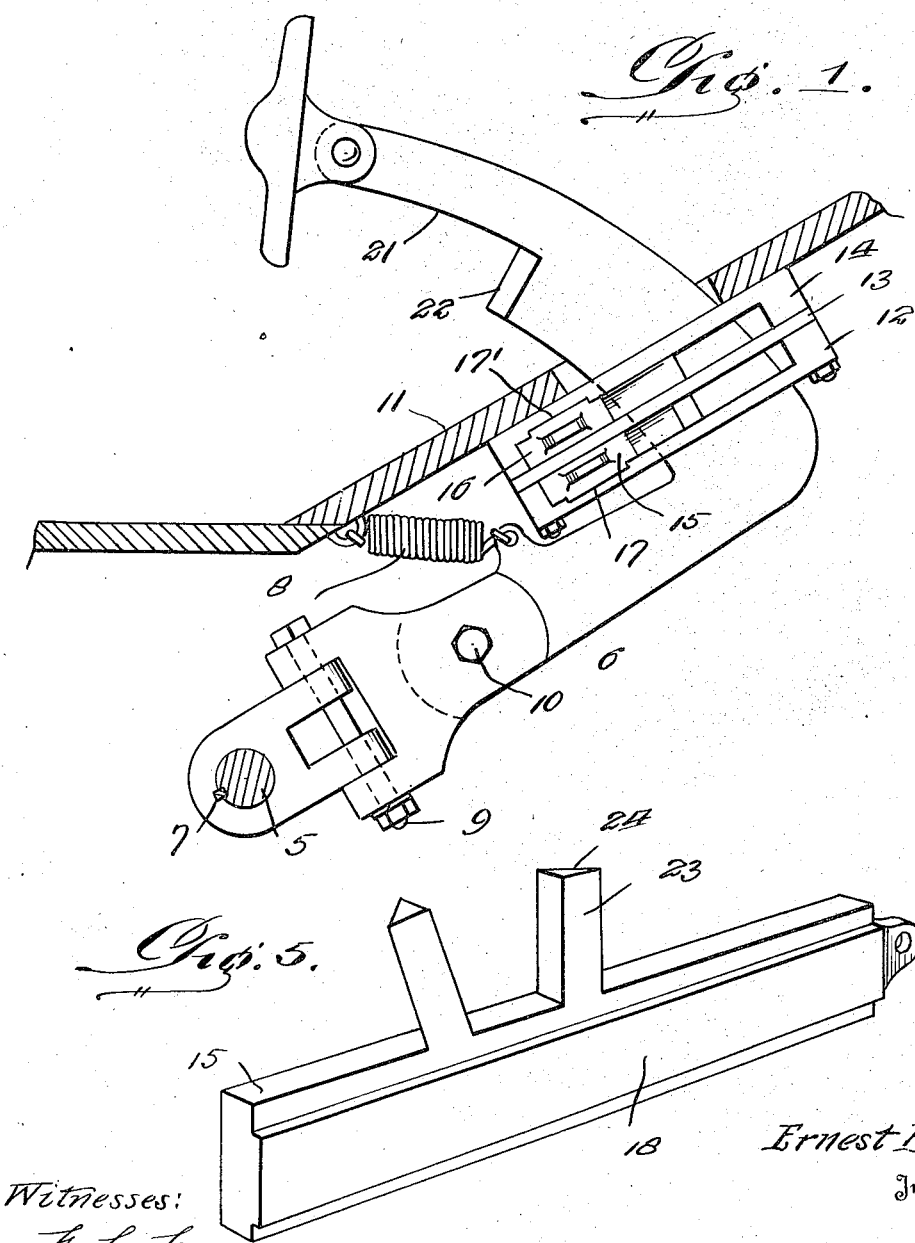

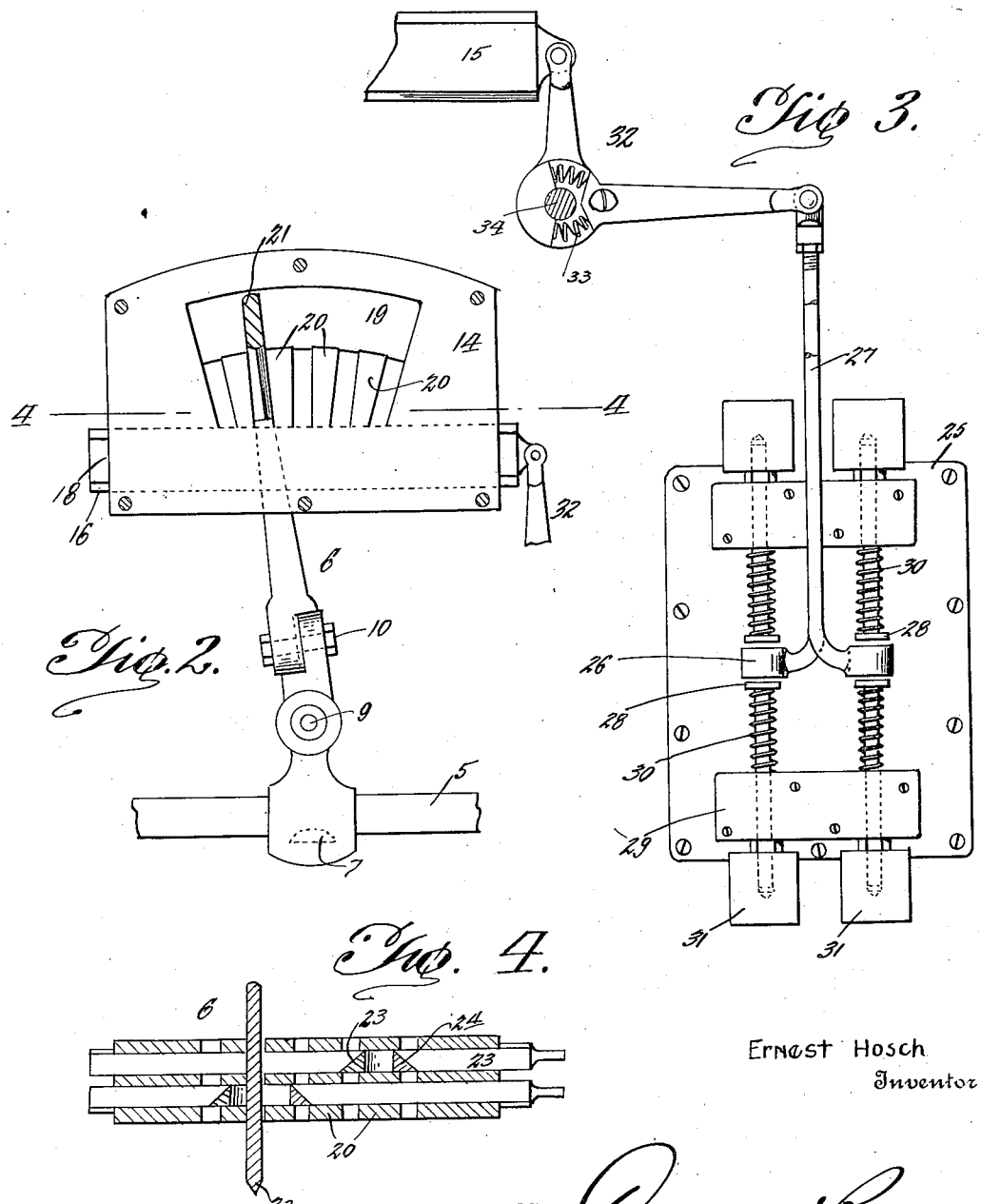

1,486,142

UNITED STATES PATENT OFFICE.

ERNEST HOSCH, OF VENTURA, CALIFORNIA.

FOOT-OPERATED CLUTCH-RELEASE AND GEAR-SHIFT MECHANISM.

Application filed August 29, 1923. Serial No. 659,949.

*To all whom it may concern:*

Be it known that I, ERNEST HOSCH, a citizen of the United States, residing at Ventura, in the county of Ventura and State of California, have invented certain new and useful Improvements in Foot-Operated Clutch-Release and Gear-Shift Mechanism, of which the following is a specification.

This invention relates to clutch operating and gear shifting mechanisms for motor vehicles and has particular reference to the provision of an apparatus by means of which the clutch may be operated and the gears shifted by the use of the foot of the driver of a vehicle so as to allow the driver to keep his right hand upon the steering wheel when utilizing the left hand for signaling purposes.

An object of the invention is to provide an apparatus of the above kind which embraces the desired qualities of simplicity, durability and efficiency in operation.

Another object of the invention is to provide means operable automatically by the release of the clutch pedal when the clutch is engaged for causing the shifting of the gear.

Other objects will appear as the nature of the invention is better understood and the same consists in the novel form, combination and arrangement of parts hereinafter more fully described, shown in the accompanying drawings, and claimed.

In the drawings, wherein like reference characters indicate like parts throughout the several views:

Figure 1 is an enlarged side elevational view of the clutch pedal and associated parts of the present invention.

Figure 2 is a view of the device shown in Figure 1, partly in horizontal section and partly in plan.

Figure 3 is a fragmentary plan view showing the operative connection between the slides and the shifting forks of the transmission gearing, partly broken away and in section.

Figure 4 is a sectional view, taken substantially upon the line 4—4 of Figure 2, and Figure 5 is an enlarged perspective view of one of the slides.

Referring more in detail to the drawings, 5 indicates the usual shaft which is rocked for operating the clutch of the motor vehicle, a clutch pedal 6 being suitably keyed as at 7 to this shaft and being adapted to be depressed in the usual manner for causing release of the clutch, and having a tension spring 8 attached thereto for returning the pedal 6 to an elevated position wherein the clutch is engaged.

In accordance with the present invention, the clutch pedal 6 is jointed, as at 9, for permitting said pedal to swing laterally and is further jointed as at 10 to permit the same to be adjusted relative to the shaft 5 for regulating the throw of the pedal.

Suitably fastened to the under side of the usual foot board 11 of the vehicle is a guide composed of the lower plate 12 and intermediate plate 13 and an upper plate 14, between which are slidable transversely of the pedal, a pair of susperposed slides 15 and 16 respectively. The plate 12 is provided with a groove as at 17 for reception of a longitudinal rib 18 on the slide 15, whereby the latter is effectively guided for rectilinear movement, and a similar rib 18 is provided on the upper side of the slide 16 for engagement in a groove 17' of the plate 14.

The plates 12, 13 and 14 are provided with openings 19 through which the clutch pedals 6 project and in which said clutch pedal is laterally movable, the inner edge of the wall of said openings 19 of the upper plate being provided with a plurality of uniformly spaced tongues 20 that are arranged in an arc concentric with the pivot 9, between the sections of the clutch pedals. The clutch pedal shank is reduced at its upper end as at 21 so that when said pedal is depressed for disengaging the clutch, the shank will clear the tongues 20 and thus allow lateral swinging movement of the clutch pedal. The wide lower portion of the shank has its upper end pointed or tapered as at 22, and the slides 15 and 16 are provided with forwardly projecting fingers 23 that have their lower faces bevelled as shown at 24, in Figures 4 and 5, the fingers 23 being normally positioned so that they each normally lie between adjacent ones of the tongues 20.

In Figure 3, the usual transmission gearing casing is shown at 25 and this casing carries the usual parallel pair of sliding rods which are adapted to be slid in reverse directions for effecting the various changes in direction and speed of the vehicle, it being noted that when one rod is slid in one direction, the reverse gears are meshed and when in an opposite direction, one of the forward speed gears are meshed, while a corresponding operation of the other rod will cause the second and high speed gears to be meshed. As this construction and the operation thereof is well known in the art specific disclosure of the same is not necessary.

In accordance with the present invention, the shifting yokes of the above mentioned sliding rods of the transmission mechanism are respectively connected to the outturned ends 26 of a pair of shifting rods 27. Thus, when one rod 27 is moved in one direction, the reverse gears will be operated to be meshed, while an operation of the same rod in an opposite direction will cause the first speed gear to be meshed. In a like manner, when the other rod 27 is moved in one direction, the second speed gears of the transmission mechanism will be meshed and when the second named rod 27 is moved in a reverse direction, the high speed gears will be meshed. The outturned ends 26 of the rods 27 are each disposed at opposite sides by means of a sliding bolt 28 that is mounted in a guide block 29 secured upon the top of the transmission casing 25, and said bolts 28 are thus arranged in pairs which oppose opposite sides of the ends 26. These bolts 28 are urged toward each other by means of helical compression springs 30 which surround said bolts 28 between the heads of the latter and the guide blocks 29. For efficient operation, as will hereinafter become apparent, the outer ends of the bolts 28 are provided with suitable weights 21. Each rod 27 is connected at its other end with one of the slides 15 and 16 by means of a bell crank lever 32 that consists of arms which are yieldable relative to each other as indicated at 33 and which is pivoted upon a suitable hinge 34.

The springs 30 normally move the rods 27, bell cranks 32 and slides 15 and 16 so that the gears of the transmission mechanism in the case 25 are normally in neutral position or disengaged from the engine of the vehicle. When in this position, each of the fingers 23 of the slides 15 and 16 will be disposed in the path of the wide portion of the shank of the clutch pedal 6 if the latter is swung laterally in alignment with the slot which said finger covers, one of said slots being without a finger so that the gears will be allowed to remain in neutral when the clutch pedal is swung laterally to the position shown in Figure 2.

Thus when the clutch pedal is depressed, the clutch will be released, and if it is desired to mesh the reverse gears, the clutch pedal is swung laterally to the proper slot and then released. The spring 8 will immediately raise the clutch pedal so as to cause the sharpened portion 22 to engage the bevelled side of the proper finger 23 for shifting the slide 15 or 16 thereof in the proper direction for effecting engagement of the reverse gears in the transverse case 25. In a like manner, the clutch pedals may be selectively aligned with the desired ones of the fingers 23 for obtaining shifting movement of either one of the plates 15 and 16 in a desired direction for changing speed in a forward direction.

It will thus be seen that either of the slides may be caused to shift in either direction at will by properly positioning the clutch pedal when in clutch releasing position through the medium of a laterally swinging movement of said clutch pedal and then through the medium of releasing said pedal for permitting its return to elevated clutch engaging position.

Minor changes may be made without departing from the spirit and scope of the invention as claimed.

What I claim as new is:

1. In combination with the usual transmission mechanism of a motor vehicle, wherein sliding of a pair of members in opposite directions effects change in forward speeds or reverse, a pair of slides, a depressible clutch pedal jointed to swing laterally, and means associated with said slides and with said clutch pedal for selectively changing said gears in response to a predetermined positioning of said clutch pedal by lateral swinging thereof.

2. In combination, a clutch pedal adapted to be depressed for release of a clutch, means for normally yieldingly elevating the clutch pedal to clutch engaging position, said clutch pedal being jointed for allowing lateral swinging movement thereof, a pair of superposed slides mounted adjacent one edge of the shank of said clutch pedal and having fingers projecting from one side thereof in different vertical planes, the lower sides of said fingers being bevelled, the upper portion of the shank of said clutch pedal being reduced to provide a narrower proportion whereby free swinging movement of the pedal laterally is permitted when said pedal is depressed with the narrow portion of the pedal shank out of the path of said fingers, the wider lower portion of the pedal shank being provided with a pointed upper edge adapted to engage the bevelled edge of a finger with which the pedal shank is aligned by lateral swinging movement for causing sliding movement of the slide carrying the finger aligned with the portion of the shank upon release of said clutch pedal, and means for operatively connecting said slides to the gear shifting rods of a transmission mechanism.

3. In combination, a clutch pedal adapted to be depressed for release of a clutch, means for normally yieldingly elevating the clutch pedal to clutch engaging position, said clutch pedal being jointed for allowing lateral swinging movement thereof, a pair of superposed slides mounted adjacent one edge of the shank of said clutch pedal and having fingers projecting from one side thereof in different vertical planes, the lower sides of said fingers being bevelled, the upper portion of the shank of said clutch pedal being reduced to provide a narrower proportion whereby free swinging movement of the pedal laterally is permitted when said pedal is depressed with the narrow portion of the pedal shank out of the path of said fingers, the wider lower portion of the pedal shank being provided with a pointed upper edge adapted to engage the bevelled edge of a finger with which the pedal shank is aligned by lateral swinging movement for causing sliding movement of the slide carrying the finger aligned with the portion of the shank upon release of said clutch pedal, and means for operatively connecting said slides to the gear shifting rods of a transmission mechanism, said last named means including a pair of rods adapted to be respectively associated with the shifting rods of the transmission mechanism and having outturned ends, and spring pressed bolts opposing opposite sides of the outturned end of each of said rods, said spring pressed bolts being normally urged toward each other for normally positioning the rods in neutral position.

In testimony whereof I affix my signature.

ERNEST HOSCH.